Dec. 31, 1968  RYUICHI MORIKAWA ET AL  3,419,061
TUBELESS TIRE
Filed Aug. 22, 1966
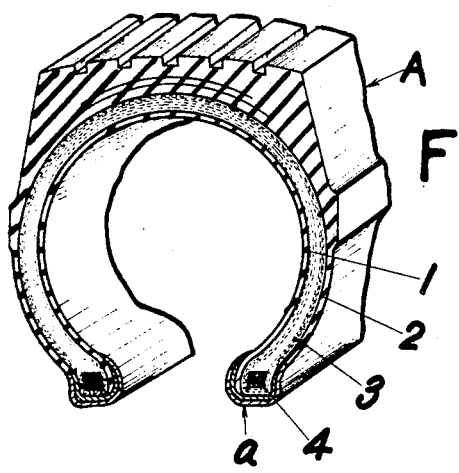
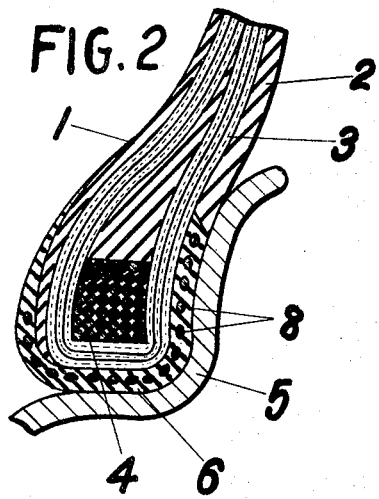
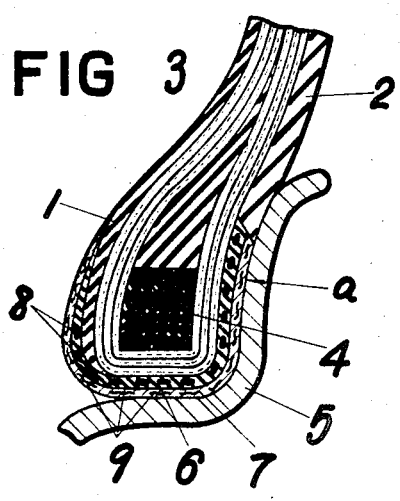
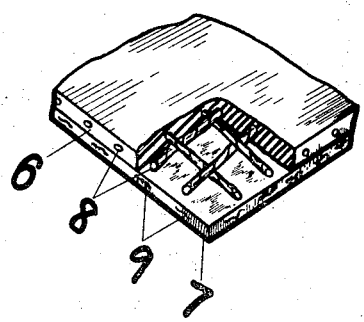
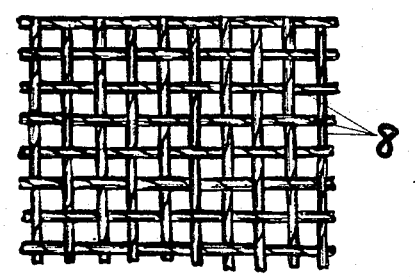
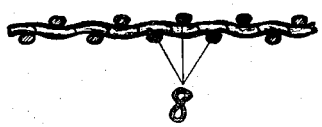
Ryuichi Morikawa,
Narajiro Shibata and
Yoshiaki Takami
:INVENTORS
BY Wenderoth Lind
And Ponack, attorneys

United States Patent Office 3,419,061
Patented Dec. 31, 1968

3,419,061
TUBELESS TIRE
Ryuichi Morikawa, Sakai, Osaka, Narajiro Shibata, Ibaraki, Osaka, and Yoshiaki Takami, Suita, Osaka, Japan, assignors to The Toyo Rubber Industries Co., Ltd.
Filed Aug. 22, 1966, Ser. No. 574,099
4 Claims. (Cl. 152—362)

ABSTRACT OF THE DISCLOSURE

Chafing material for pneumatic tubeless tire adapted to be disposed around the bead portions of the tire, said chafing material comprising a woven fabric having warp and weft elements which are yarns consisting of from 2 to 50 filaments and having a twist which is less than 20 turns/10 cm., the yarn being embedded in, and the interstices of said yarn having therein, only an elastomeric high polymer material.

---

This invention relates to improvement in a pneumatic tubeless tire, and more particularly to a tubeless tire provided with special chafing strips for the bead portions thereof.

Prior woven fabric for chafing strips such as cotton or multifilament yarns fabric (fabric formed of yarns composed of a plurality of filaments, e.g. 300–400) has been comprised of yarns consisting of a plurality of short fibers and filaments and is formed of yarns twisted together with a high twist. When such fabric is utilized as chafing strips around the bead portions of a tubeless tire, there is often encountered a phenomenon that inflationary air in the tire leaks through the yarns composing the chafing fabric or the monofilaments thereof. On the other hand, it was proposed recently to employ fabric of monofilament yarns coated with elastomeric high polymer such as rubber, but there were still problems of lack of flexibility and undesired faults in working.

The present invention is characterized by providing a preferable fabric structure as chafing strips for the bead portions af a tubeless tire, there being no air leakage as above-mentioned and having good workability.

Accordingly, it is a requisite that the said fabric should have a construction capable of preventing leakage of inflationary air in the tire and have easy workability as chafing fabric. Namely, it is required that in tire forming, the chafing fabric be easily deformed in the bias direction and be easily wound around the bead portions without causing puckering or producing nonuniform portions, and that the fabric have a construction such that no air in the tire leaks through the chafing strips along or through the bead portions.

Therefore, one object of this invention is to provide a tubeless tire which has been fabricated by embedding a fabric meeting the above two conditions of good workability and air-imperviousness, in elastic high polymer material to make chafing strips and uniting them with the outermost bead portion thereof.

The other object of this invention is to provide a tubeless tire in which a chafing strip arranged in the bead portions comprises a laminate made by sticking a thin layer of rubber sheet having fibers dispersed therein to the above chafing strip. When employing monofilament yarn fabric as in the prior art, it is possible to reduce air-permeability but there is present the drawback of difficult workability. When the fabric comprises a plurality of filaments, it is easily worked but disadvantageously, great air-permeability persists.

The present invention will be described in detail with reference to the accompanying drawing in which:

FIG. 1 is a fragmentary perspective view of a tubeless tire embodying the invention with portions in section;
FIG. 2 is an enlarged fragmentary sectional view of the bead portion of the tire shown in FIG. 1 having a chafing strip of mono-layer construction;
FIG. 3 is also an enlarged fragmentary sectional view of the bead portion of the tire of FIG. 1 having a chafing strip of laminate construction;
FIG. 4 is a fragmentary perspective view of a chafing strip having a laminate structure, partially broken away to show the fabric texture;
FIG. 5 is a plan view showing the fabric texture of the chafing strip structure; and
FIG. 6 is a side view of FIG. 5.

The present fabric for chafing strips is composed of from not less than 2 to not more than 50 filaments in both warp and weft elements with yarns of such low twist for good workability, that the filaments in each yarn are not loose, preferably below 20 turns/10 cm.

As compared flexibility of woven fabric comprised of single filament yarns with that of woven fabric comprised of two filament yarns twisted together, to see how the filament number has an influence on workability, though both fabrics are similar in strength per definite width, the latter has about 55% of the hardness of the former and thus it will be understood that flexibility increases remarkably by twisting together two filament yarns. As the number of filament yarn twisted increases, hardness is reduced but the amount reduction becomes low. On the other hand, from the view point of air-imperviousness it is seen, as shown in after-mentioned table that yarn with a filament number over 100 is unsuitable for chafing strip fabric of tubeless tires if used in the conventional way. Workability and air-imperviousness of rubberized fabric are influenced by not only the filament number but also the sort and properties of the rubber compound to be employed, calendering condition, cutting condition of the rubberized fabric, process of applying to the tire etc., and are never determined by only factors relating to the fabric. Therefore, as a result of investigating these variables other than fabric construction, it was found that the number of filaments of the twisted yarns is preferably in a range of 2 to 50, to provide practically satisfactory properties. If it is required to increase adhesiveness of this fabric with rubber, this fabric may be previously treated with adhesive such as resorcinol formaldehyde latex (R.F.L.) but it is not always necessary to so treat the fabric. The reason is because if the number of filaments constituting the yarns and the twist number are low, it is not necessary to treat with a filler to fill the penetrates throughout the interstices of filaments and completely coats individual filament yarns, so that air among the filaments is removed completely. This resolves the prior art problem that the yarn spaces serve for passage of leaking air. Accordingly, interstices of the filament yarns, before rubberizing by means of calendering. In coating with rubber by calender rolls, rubber resorcinol-formaldehyde latex (R.F.L.) is employed, if necessary, not to fill the spaces in the filament yarns but to elevate adhesiveness of rubber.

When this fabric for chafing strips coated entirely with rubber is employed as chafing material for tubeless tires, the phenomenon of air measuring among filaments and inflationary air in the tire passes through bead portions can be avoided. Furthermore, since the fabric is comprised of yarns of appropriate and plural filaments with a low twist, it is excellent in deformability and flexibility, as compared with prior fabric comprising monofilament yarns having the same tenacity as this fabric, and so is easily handled in fabricating. Since the chafing strip construction in the tubeless tires of the present invention comprises the above-described fabric of yarns consisting of a few number of filaments with very little twist, the form of the yarns is nearly flat in cross-section, not round in form like the construction of monofilament yarns or of ordinarily twisted yarns.

In applying chafing strips to a tubeless pneumatic tire assembly, a chafing strip construction comprised of a single layer of rubberized fabric may be employed, but it is preferred to employ a laminated chafing strip construction wherein a thin rubber sheet having fibers dispersed therein is stuck on the said single layer, since it will make the contact of the face of chafing strip with the rim better and so will better avoid air leakage. The laminate structure comprises rubberized air-impervious fabric layer wherein air-impervious fabric of yarns consisting of a small number of filaments with little twist is embedded in a rubber, and rubber sheet having fibers dispersed therein which as mentioned hereinafter has comparably low fluidity under heat, the layer and the sheet being stuck together and united. By this rubber sheet having fibers dispersed therein is not meant a sheet of rubber only but one in which fine, short fibers and filaments are dispersed irregularly in the rubber. The length of fiber to be dispersed is not particularly limited but is preferably 0.5 mm.–10 mm., so that fibers will not entangle or aggregate in the rubber.

As fiber material, there may be used nylon, vinylon, rayon, polyester, cotton or any other, among which nylon and polyester are excellent in abrasion resistance when rubbing against tire rim. As to the amount of fiber dispersed in the rubber, up to 35 percent by weight of the rubber compound can be used, but an amount in the neighborhood of 8 percent is desirable, from the standpoint of dispersing density and air-imperviousness. The thickness of the sheet can be in the range of 0.2 mm.–1.0 mm. but is desirably in the neighbourhood of 0.5 mm., in order to give full scope to the effect of resistance to rubber flow which is later described.

Employing the said rubber sheet having fibers dispersed therein brings about the effect that when it is placed on the exterior surface of bead portions of a tire, i.e. rim side, rubber in a state of high temperature during vulcanizing is controlled with respect to flow owing to fibers dispersed therein and after vulcanizing, rubber is attached in a relatively thick and uniform layer onto air-impervious fabric comprising yarns of a few filaments with a low twist for chafing strips for the bead regions of the tire, without forming, as before, unevenness on the outermost surface of bead regions. As a result air is precluded from leaking by passing through uneven parts, and breaking of bead regions due to abrasion between rim and the chafing strips is also avoided. On the other hand, in case a usual rubber sheet instead of a rubber sheet having fibers dispersed therein is disposed on the rim surface of the tire bead, it is difficult to obtain satisfactory, smooth surface contact with the rim, since the rubber of the surface layer flows readily during tire vulcanizing, particularly in the region with a low radius of curvature in the bead regions and as a result, unevenness due to the fabric texture appears at the surface. Air never leaks through the said rubber sheet having fibers dispersed therein between spaced fibers which form a passageway, since the fibers in the rubber are not entangled and individual fibers are covered entirely with rubber.

With regard to workability, the rubber sheet having fibers dispersed therein behaves substantially similarly to an all-rubber sheet, as the fibers are extremely fine and short and the thickness is comparatively small, that is to say, there are no inconveniences when molding, e.g. puckering and stiffness.

Referring to FIG. 1, the tubeless tire of the present invention is constructed by placing the chafing strip having a mono-layer construction as shown in FIG. 2 or of laminate construction as shown in FIG. 3 around the bead portions of conventional tubeless tires comprising an inner liner 1 composed of air-impervious rubber, an outer covering of rubber 2 such as tread and sidewall, carcass 3 and bead wire 4. FIG. 1 is a fragmentary perspective view of a tubeless tire having a two-layer laminate structure (a) with portions in section.

FIG. 2 is an enlarged sectional view of bead portions having a chafing strip of monolayer structure, wherein a rubberized, air-impervious fabric layer, i.e. chafing material 6 in which air-impervious fabric comprising warp threads and weft threads 8 having a small number of filaments and a low twist is embedded in a rubber and placed on the bead portion adjacent to tire rim 5.

FIG. 3 illustrates a bead portion wherein chafing strip $a$ has a laminate construction comprising a layer of chafing material 6 as in FIG. 2 and a rubber sheet 7 having fibers dispersed therein and is placed on the bead portion adjacent to tire rim 5. The details of the chafing strip $a$ in FIG. 3 are illustrated in FIG. 4 wherein chafing material 6 has embedded therein fabric comprised of warp and weft elements 8 consisting of a small number of filaments with a low twist, thus forming a rubberized air-impervious fabric layer, and a thin layer of rubber sheet 7 having fibers 9 dispersed therein, fabricated by dispersing or compounding scattered discontinuous, fine and short fibers 9 in rubber, is secured to the chafing material 6 to make chafing strip $a$ of a laminate structure.

The chafing strip $a$ of laminate structure in FIG. 3 has two layers, but is not limited to two layers. At least one of the rubber sheets with fibers dispersed thereon is on rim side of the bead portions.

FIG. 5 and FIG. 6 illustrate the plain weave texture of air-impervious fabric composed of yarns of a small number of filaments with a low twist.

Test results of the air-permeability are set forth hereinafter, comparing the chafing material of the present tubeless tire with prior art fabric chafing material.

The comparison is based on the period required until air permeates through the fabric having a definite length, embedded in rubber and vulcanized.

For a control sample, a rubber compound for coating as exemplified in the following example was employed, and the thickness of the rubberized fabric and that of the rubber sheet having fibers dispersed therein were 1 mm. and 0.4 mm., respectively.

One example of a rubber for coating is given in the following table.

| | Parts by weight |
|---|---|
| Natural rubber | 75 |
| SBR (No. 1502) | 25 |
| Zinc oxide | 25 |
| Stearic acid | 2 |
| Styrenated phenol | 2 |
| Carbon black (FEF) | 55 |
| Process oil | 8 |
| Accelerator (CZ) | 1 |
| Sulfur | 2.5 |

The following table gives an example of a rubber having fibers dispersed therein.

| | Parts by weight |
|---|---|
| Natural rubber | 75 |
| SBR (No. 1502) | 25 |
| Zinc oxide | 3 |
| Stearic acid | 2 |
| Styrenated phenol | 2 |
| Carbon black (FEF) | 55 |
| Process oil | 8 |
| Accelerator (CZ) | 1 |
| Sulfur | 2.5 |
| Short fiber | 10 |

As short fiber there are employed rayon filaments of 1.5 denier 4 mm. in length.

As prior art materials there were employed, (A) a fabric of nylon plain-weave texture composed of 136 filaments of 840 denier and (B) fabric of cotton No. 40 plain-weave texture, both being embedded in rubber composition according to the first example above.

The samples employed for chafing strips of the present invention are as follows:

(C) fabric of nylon plain-weave texture composed of 10 filaments of 880 denier embedded in rubber and (D) laminate comprising the said fabric (C) and a rubber sheet having discontinuous fibers dispersed therein (0.4 mm. in thickness); (E) fabric of vinylon plain-weave texture composed of 3 filaments of 300 denier embedded in rubber and (F) laminate comprising the said fabric (E) and a rubber sheet having fibers dispersed therein (0.4 mm.); (G) fabric of nylon plain-weave texture composed of 5 filaments of 1100 denier embedded in rubber and (H) laminate comprising the said fabric (G) and a rubber sheet having fibers dispersed therein (0.4 mm.); (I) fabric of nylon plain-weave texture composed of 3 filaments of 660 denier, embedded in rubber and (J) laminate comprising the fabric (I) and fibers-dispersed rubber sheet (0.4 mm.). The following table shows the results of the comparative test.

Sample (permeation time per 5 cm.):
A _____sec.___ 30–60
B _____sec.___ 10–15
C–J _____hrs.___ >24

As shown above all samples of C to J were found to be air-impermeable even after a lapse of 24 hours.

It is to be understood that the chafing employed for the tubeless tire of this invention is easily workable in tire forming and besides increases remarkably air-imperviousness as compared with prior cotton or multi-filament fabric. When a tubeless tire assembly is composed of the present chafing, air is substantially completely precluded from permeating and particularly in case of the laminate structure, the bead surface in contact with rim always has a smooth face and so enhances abrasion resistance and prevents injury to the bead portions.

What is claimed is:

1. Chafing material for pneumatic tubeless tire adapted to be disposed around the bead portions of the tire, said chafing material comprising a woven fabric having warp and weft elements which are yarns consisting of from 2 to 50 filaments and having a twist which is less than 20 turns/10 cm., the yarn being embedded in, and the interstices of said yarn having therein, only an elastomeric high polymer material.

2. Chafing material as claimed in claim 1 further comprising at least one rubber sheet adhered to said embedded woven fabric and having discontinuous fibers dispersed therein, said rubber sheet being disposed on the side of the embedded woven fabric which is toward the rim of the wheel on which the tire is mounted.

3. Chafing material as claimed in claim 2 in which said discontinuous fibers having a length of from 0.5 to 10 mm. and said rubber sheet having a thickness of from 0.2 to 1.0 mm.

4. A pneumatic tubeless tire, comprising chafing strips disposed around the bead portions of the tire, the chafing strips being of chafing material comprising a woven fabric having warp and weft elements which are yarns consisting of from 2 to 50 filaments and having a twist which is less than 20 turns/10 cm., the yarn being embedded in, and the interstices of said yarn having therein, only an elastomeric high polymer material.

References Cited
UNITED STATES PATENTS

| | | | |
|---|---|---|---|
| 2,934,126 | 4/1960 | Wilson | 152—362 |
| 3,013,599 | 12/1961 | Riggs | 152—362 |
| 3,040,797 | 6/1962 | Saint Paul | 152—362 |

FOREIGN PATENTS 1,153,791  3/1958  France.

ARTHUR L. LA POINT, *Primary Examiner.*

C. B. LYON, *Assistant Examiner.*